United States Patent
Nakajima

(10) Patent No.: US 9,050,857 B2
(45) Date of Patent: Jun. 9, 2015

(54) TIRE CORD FABRIC AND PNEUMATIC TIRE

(75) Inventor: Miyuki Nakajima, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 0 days.

(21) Appl. No.: 13/983,244

(22) PCT Filed: Feb. 4, 2012

(86) PCT No.: PCT/JP2012/000754
§ 371 (c)(1),
(2), (4) Date: Aug. 1, 2013

(87) PCT Pub. No.: WO2012/105276
PCT Pub. Date: Aug. 9, 2012

(65) Prior Publication Data
US 2013/0312891 A1    Nov. 28, 2013

(30) Foreign Application Priority Data
Feb. 4, 2011    (JP) .................................. 2011-022474

(51) Int. Cl.
*B60C 9/18*    (2006.01)
*D02G 3/48*    (2006.01)
*D03D 1/00*    (2006.01)
*D03D 15/00*    (2006.01)
*D03D 13/00*    (2006.01)

(52) U.S. Cl.
CPC ....... *B60C 9/1807* (2013.04); *Y10T 152/10765* (2015.01); *B60C 9/18* (2013.01); *D02G 3/48* (2013.01); *D10B 2331/02* (2013.01); *D10B 2331/021* (2013.01); *D03D 1/00* (2013.01); *D03D 15/00* (2013.01); *D10B 2505/022* (2013.01); *D03D 13/008* (2013.01); *D03D 15/0027* (2013.01)

(58) Field of Classification Search
CPC .................................. B60C 9/18; B60C 9/1807
See application file for complete search history.

(56) References Cited

U.S. PATENT DOCUMENTS

| | | | | |
|---|---|---|---|---|
| 4,739,814 A | * | 4/1988 | Berczi et al. | 152/527 |
| 4,768,575 A | * | 9/1988 | Bruner et al. | 152/552 |
| 6,533,012 B1 | * | 3/2003 | Jardine et al. | 152/527 |

(Continued)

FOREIGN PATENT DOCUMENTS

| | | |
|---|---|---|
| JP | 2004-277933 A | 10/2004 |
| JP | 2005-154963 A | 6/2005 |

(Continued)

OTHER PUBLICATIONS

International Search Report of corresponding International Application No. PCT/JP2012/000754, dated on Feb. 28, 2012.

(Continued)

*Primary Examiner* — Justin Fischer
(74) *Attorney, Agent, or Firm* — Global IP Counselors, LLP

(57) ABSTRACT

A cord fabric is structured by weaving a weft yarn into a large number of warp yarn (2) disposed in parallel so that the weft yarn crosses the warp yarn at a coarse density. In the cord fabric, the warp yarn is a composite cord constituted of at least one aramid first twist yarn and one aliphatic polyamide first twist yarn, and the weft yarn is a spun yarn of meta system aramid fiber. The cord fabric is used as a strip material of a belt cover layer which is wound in a spiral pattern around an outer circumference of a belt layer of a pneumatic tire in a radial direction.

13 Claims, 4 Drawing Sheets

(56) References Cited

U.S. PATENT DOCUMENTS 6,609,552 B2 * 8/2003 Miyazaki et al. ............. 152/527
7,614,436 B2 * 11/2009 Ternon et al. ................ 152/526

FOREIGN PATENT DOCUMENTS

| | | |
|---|---|---|
| JP | 2007-283897 A | 11/2007 |
| JP | 2008-290516 A | 12/2008 |
| JP | 2009-132324 A | 6/2009 |
| JP | 2009-161891 A | 7/2009 |
| WO | 2009-144244 A1 | 12/2009 |

OTHER PUBLICATIONS

Decision to Grant a Patent of corresponding Japanese Patent Application No. 2012-518335, dated on May 29, 2012.

* cited by examiner

TIRE CORD FABRIC AND PNEUMATIC TIRE

CROSS-REFERENCE TO RELATED APPLICATIONS

This U.S. National stage application claims priority under 35 U.S.C. §119(a) to Japanese Patent Application No. 2012-518335, filed in Japan on Feb. 4, 2012, the entire contents of Japanese Patent Application No. 2012-518335 are hereby incorporated herein by reference.

FIELD OF THE INVENTION

The present invention relates to a tire cord fabric and a pneumatic tire.

DESCRIPTION OF THE RELATED ART

A belt cover layer disposed in a pneumatic tire (hereinbelow simply referred to as tire) is formed by winding a fiber cord on the outer circumference side of a belt layer that is a structural member of the tire, in a spiral manner in the tire circumferential direction. By disposing the belt cover layer in this way, high-speed durability can be improved and road noise can be suppressed in the tire since rising of the belt layer in the tire radial direction while the tire is rotating can be prevented.

However, when the vehicle is parked for a long period of time after being driven at high speed, a flat spot may be formed in a tire tread portion while the tire is cooling down. A flat spot is a spot having a temporarily flat shape when the tire tread portion abutting the ground is pressed against the ground. Tire uniformity deteriorates due to the formation of the flat spot in this way, resulting in an increase in road noise and vibration.

It is known that the abovementioned belt cover layer greatly influences the occurrence of the flat spot in comparison to the other tire structural members. Consequently, a technique for using aramid fiber with excellent heat resistance as a fiber cord for configuring the belt cover layer has been proposed as described, for example, in Japanese Unexamined Patent Application Publication No. 2009-132324. However, there is a problem that tire uniformity deteriorates when the number of woven strands of the aramid fiber is uneven in the tire width direction due to a highly elastic cord of aramid fiber.

SUMMARY

An object of the present invention is to provide a tire cord fabric and a pneumatic tire that allow for improved processability and tire uniformity compared to the prior art even when aramid fiber is used in the fiber cord on the belt cover layer for suppressing flat spots since the above problem is resolved.

An aspect of the present invention is a tire cord fabric.

The tire cord fabric includes
a plurality of warp yarns disposed in parallel, and
a weft yarn weaved so as to cross the warp yarn in a coarse density.

The warp yarn includes at least one aramid first twist yarn having a first twist added to an aramid fiber bundle, and one aliphatic polyamide first twist yarn having a first twist in the same direction as the aramid first twist yarn added to an aliphatic polyamide fiber bundle.

The aramid first twist yarn and the aliphatic polyamide first twist yarn are bundled and second twisted in the direction opposite the first twist.

The weft yarn is a spun yarn of meta-aramid fiber.

Another aspect of the present invention is a pneumatic tire.

The pneumatic radial tire comprises: a carcass layer mounted between a pair of left and right bead portions, a belt layer disposed to the outside of the carcass layer in the tire radial direction, and a belt cover layer formed by a strip material of a cord fabric covered in rubber spirally wound onto the outer circumference of the belt layer in the tire radial direction, in a manner oblique to the tire circumferential direction. The cord fabric includes a plurality of warp yarns disposed in parallel, and a weft yarn weaved so as to cross the warp yarns in a coarse density, the warp yarns extending in the longitudinal direction of the strip material. The warp yarns includes at least one aramid first twist yarn having a first twist added to an aramid fiber bundle, and one aliphatic polyamide first twist yarn having a first twist in the same direction as the aramid first twist yarn added to an aliphatic polyamide fiber bundle, and the aramid first twist yarn and the aliphatic polyamide first twist yarn are bundled and second twisted in the direction opposite the first twist. The weft yarn is a spun yarn of meta-aramid fiber.

According to the tire cord fabric and the pneumatic tire of the present invention, improved processability and tire uniformity can be achieved compared to the prior art even when aramid fiber is used in the fiber cord on the belt cover layer for suppressing flat spots.

DESCRIPTION OF EMBODIMENTS

Figure 1:
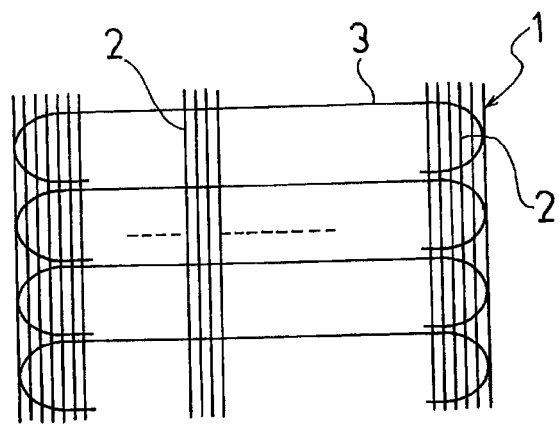
FIG. 1 is a schematic view of a tire cord fabric of an embodiment of the present invention.

A configuration of the present invention will be explained in detail hereinbelow with reference to the attached drawings. FIG. 1 is a schematic view of a tire cord fabric of an embodiment of the present invention.

A cord fabric 1 is constructed by weaving weft yarns 3 into a large number of warp yarns 2 disposed in parallel so that the weft yarns 3 cross the warp yarns 2 at a coarse density. The weft yarns 3 are folded back at both end parts in the width direction of the cord fabric 1.

Figure 2:
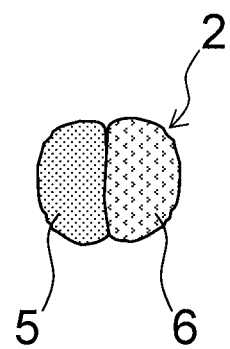
FIG. 2 illustrates a configuration of a warp yarn of the tire cord fabric illustrated in FIG. 1.

As illustrated in FIG. 2, the warp yarns 2 in the cord fabric 1 are configured of a composite cord in which at least one aramid first twist yarn 5 having a first twist in an aramid fiber bundle, an aramid first twist yarn and one aliphatic polyamide first twist yarn 6 having a twist in the same direction in an aliphatic polyamide fiber bundle, are bundled and a second twist is added in the direction opposite to the first twist. FIG. 2 describes a configuration of the warp yarn of the tire cord fabric illustrated in FIG. 1. The weft yarn 3 is configured by a spun yarn of a meta-aramid fiber.

Since the warp yarn 2 of the cord fabric 1 of the present embodiment is configured by a composite cord in which the aramid first twist yarn and the aliphatic polyamide first twist yarn are twisted together, the warp yarn 2 that functions as a reinforcing cord exhibits the excellent heat resistance due to the aramid fiber and the occurrence of flat spots can be suppressed when used in a tire. If a different twist direction were to be used, the flatness of the cord fabric itself would be lost and processability would be adversely affected. It is thought that loose ends may occur in the strip material that configures the belt cover layer and is made using such a cord fabric thus adversely affect tire uniformity.

Moreover, since the weft yarn 3 of the cord fabric 1 of the present embodiment is configured of a spun yarn of meta-aramid fiber having a high elongation at break, the shape of the cord fabric disposed with the warp yarn 2 that functions as the reinforcing cord provided at substantially equal intervals can be maintained correctly. As a result, the reinforcing cord (namely, the warp yarn 2) is disposed at substantially equal intervals and tire uniformity can be improved when the cord fabric 1 is used in the tire.

Although the occurrence of the flat spot can be suppressed due to the excellent heat resistance, fatigue in the aramid fiber occurs easily and thus tire fatigue resistance deteriorates if the warp yarn 2 is made up of only the aramid fiber and used as the reinforcing cord in the tire. Alternatively, since the heat resistance is insufficient if the warp yarn 2 is made up only of the aliphatic polyamide fiber, the occurrence of flat spots may not be suppressed.

At least one strand of aramid first twist yarn may be used in one warp yarn 2, or preferably one or two strands for a total of three first twist yarn strands may be used to configure the composite cord. When three or more aramid first twist yarn strands are used so that the first twist yarn that configures the composite cord has a total of four strands, the warp yarn 2 becomes too thick and thus the reinforcing cord becomes too thick which adversely affects tire uniformity when used in the tire.

Since the elongation at break is reduced when a spun yarn of para-aramid fiber is used as the weft yarn 3, the weft yarn 3 may easily fall out during fabrication and it becomes difficult to maintain the shape of the cord fabric 1. As a result, the warp yarn 2 that functions as the reinforcing cord becomes unevenly disposed and uniformity is adversely affected when used in the tire.

A para-aramid fiber such as commonly used Kevlar (trademark) or Twaron (trademark) is preferably used as the aramid fiber used in the warp yarn 2.

The elongation at break of the weft yarn 3 is preferably no less than 10%. The elongation at break of the weft yarn 3 is more preferably no less than 10% and no more than 25%. The elongation at break is a value measured in conformance with a method described in JIS L1017. The yarn fiber fineness of the weft yarn 3 is preferably 150 to 350 dtex. The shape of the cord fabric 1 with the warp yarn 2 disposed in substantially equal intervals can be maintained correctly due to the elongation at break and the yarn fiber fineness of the weft yarn 3.

The weft yarn 3 would easily fall out in the cord fabric 1 if the elongation at break at break of the weft yarn 3 were 10% less and thus the shape of the cord fabric 1 with the warp yarn 2 disposed in substantially equal intervals could not be maintained correctly. If the elongation at break of the weft yarn 3 is greater than 25%, the processability is adversely affected when forming the strip material from the cord fabric coated in rubber. If the yarn fiber fineness of the weft yarn 3 is less than 150 dtex, the weft yarn 3 in the cord fabric may break easily and it would be difficult to dispose the warp yarn 2 in substantially equal intervals. If the yarn fiber fineness of the weft yarn 3 is greater than 350 dtex, the weft yarn 3 would be too thick and the warp yarn 2 would have a step and be disposed in a zigzag manner in the cross-section of the cord fabric 1 so that the flatness of the cord fabric 1 would be lost.

Preferably, a total fiber fineness D1 of the warp yarn 2 is 3000 to 5000 dtex and a ratio D1/D2 between the total fiber fineness D1 of the warp yarn 2 and a fiber fineness D2 of the weft yarn 3 is 17 to 25. The shape of the cord fabric 1 with the warp yarn 2 disposed in substantially equal intervals can be further maintained correctly by prescribing the fiber finenesses of the warp yarn 2 and the weft yarn 3 in this way.

When the warp yarn 2 with the total fiber fineness D1 of less than 3000 dtex is used in the tire, the rising of the belt layer in the tire radial direction due to the centrifugal force while the tire is rotating cannot be prevented sufficiently and high-speed durability cannot be sufficiently improved. When the total fiber fineness D1 of the warp yarn 2 is greater than 5000 dtex, the weight balance of the overlapping portions at the longitudinal end parts of the strip material 20 that configures the belt cover layer becomes worse since the cord diameter increases and the belt cover layer becomes thicker, thus adversely affecting uniformity. If the ratio D1/D2 is less than 17, the weft yarn 3 would be thick compared to the warp yarn 2 and the warp yarn 2 would be disposed in a zigzag manner in the cross-section of the cord fabric 1 so that the flatness of the cord fabric 1 would be lost. If the ratio D1/D2 is greater than 25, the weft yarn 3 would be thin compared to the warp yarn 2 and the weft yarn 3 in the cord fabric 1 could easily break so that the shape of the cord fabric 1 could not be maintained sufficiently.

The tire cord fabric of the present invention can be used in the carcass layer, the belt cover layer, or a side reinforcing layer. The tire cord fabric is preferably used in particular in the belt cover layer.

The following describes in detail the tire cord fabric of the present invention being used in the belt cover layer of a pneumatic tire.

Figure 3:
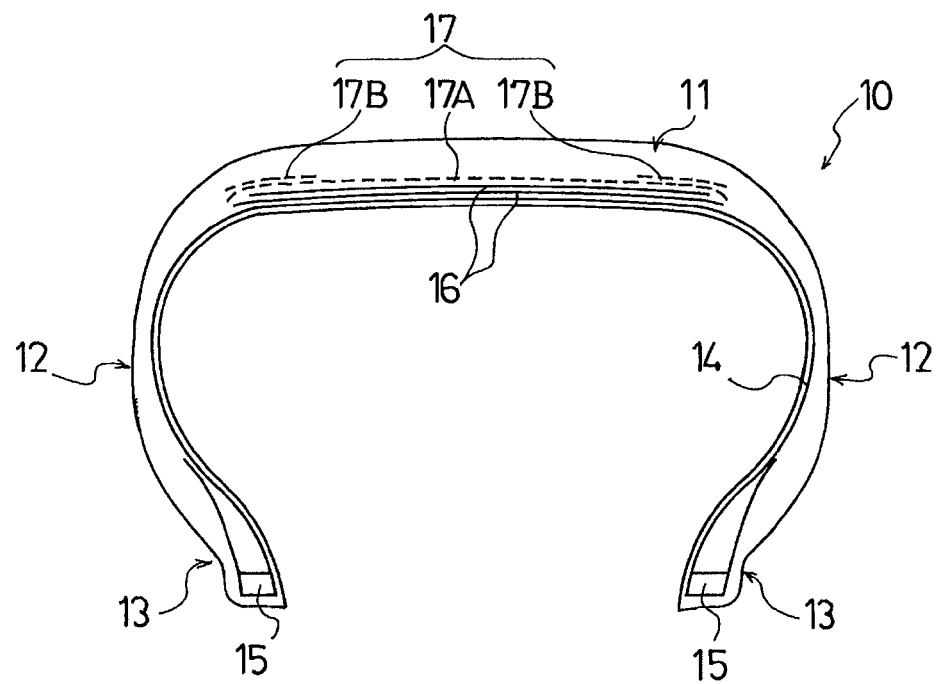
FIG. 3 illustrates a cross-section construction of a general pneumatic tire using the tire cord fabric of the present embodiment.

FIG. 3 illustrates a general construction of a pneumatic tire 10 in which the tire cord fabric of the present invention is used in the belt cover layer. In FIG. 3, reference number 11 is a tread portion, reference number 12 is a sidewall portion, and reference number 13 is a bead portion. A carcass layer 14 is mounted between the pair of left and right bead portions 13, 13. The carcass layer 14 includes a plurality of reinforcing cords that extend in the tire radial direction, and is wound from the inside of the tire toward the outside around bead cores 15 disposed in the bead portions 13. Conversely, two-layer belt layer 16 made up of steel cords are disposed on the outside in the tire radial direction of the carcass layer 14 at the tread portion 11 so that the directions which the steel cords extend in the two layers intersect each other. Furthermore, a belt cover layer 17A that covers the full width of the belt layer 16, and belt cover layers 17B that cover the shoulder regions of the belt layer 16, are provided on the outer circumferential side of the belt layer 16. The tire radial direction refers to a direction that extends radially with respect to the rotational axis of the tire 10. The outer side in the tire radial direction refers to a side that is further away from the tire rotational axis. The tire width direction refers to a direction parallel to the tire rotational axis and is the crosswise direction in FIG. 3.

Figure 4:
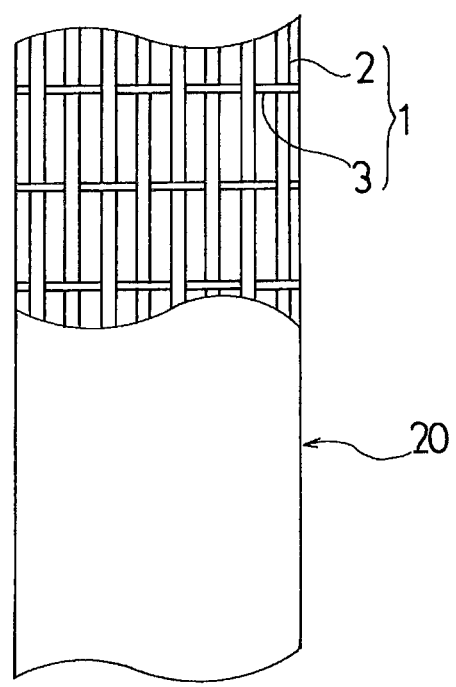
FIG. 4 illustrates a strip material construction that constitutes a belt cover layer of the pneumatic tire of the present embodiment.
Figure 5:
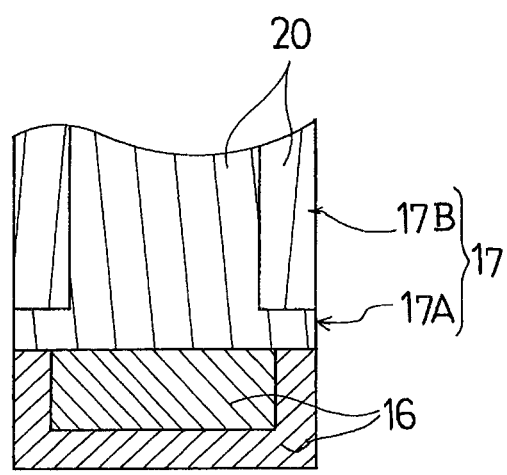
FIG. 5 illustrates a laminated construction of a belt cover layer and a belt layer in the pneumatic tire of the present embodiment.

As illustrated in FIGS. 4 and 5, the belt cover layers 17 are configured by cutting (slitting) the cord fabric 1 made up of the warp yarn 2 and the weft yarn 3 covered in rubber coating and cut into a strip material 20 that extends in the warp yarn direction. The strip material 20 is wound onto the outer circumferential side of the belt layer 16 in a spiral manner at a slant of 5° or less with respect to the tire circumferential direction. The width of the strip materials 20 is preferably 1.5% to 7% of the maximum width of the belt layer 16. The width of the strip material 20 is, for example, 2 to 20 mm. The warp yarn 2 is configured of a composite cord in which at least one aramid first twist yarn 5 having a first twist in an aramid fiber bundle, and one aliphatic polyamide first twist yarn 6 having a first twist in the same direction as the aramid first twist yarn in an aliphatic polyamide fiber bundle, are bundled and a second twist is added in the direction opposite to the first twist. The weft yarn 3 is a spun yarn of a meta-aramid fiber.

By using the cord fabric 1 in the belt cover layer 17 of the tire 10, the rising of the belt layer 16 in the tire radial direction while the tire is rotating is suppressed and excellent high-speed durability can be achieved, and the occurrence of flat spots can be suppressed due to the excellent heat resistance of the aramid fiber. Since the weft yarn 3 is configured with the meta-aramid fiber spun yarn having excellent dimensional stability, the shape in which the warp yarn 2 can be disposed in substantially equal intervals in the cord fabric that functions as the reinforcing cords in the belt cover layer 17, is maintained correctly thus enabling an improvement in tire uniformity.

If the width of the strip material 20 that configures the belt cover layer 17 is less than 2 mm, the width would be too narrow and the strip material 20 could not be constructed. If the width of the strip material 20 were greater than 10 mm, the weight balance of the overlapping portions at the end portions in the longitudinal direction of the strip material 20 would become worse and tire uniformity could not be sufficiently improved.

If the slant with respect to the tire circumferential direction of the strip material 20 that configures the belt cover layer 17 were greater than 5°, the formation of the belt cover layer 17 would become difficult and the fastening effect due to the belt cover layer 17 would be reduced. As a result, the above slant is preferably no more than 5°.

In FIG. 3, while the two layers of the belt cover layer 17A that covers the full width of the belt layer 16 and the belt cover layers 17B that cover the shoulder regions of the belt layer 16 are provided as the belt cover layer 17, the belt cover layer 17 may be provided in any number of layers in any form as long as the strip material 20 constructed with the abovementioned cord fabric 1 is used.

Although the occurrence of flat spots can be suppressed due to the excellent heat resistance of the aramid fiber, fatigue in the aramid fiber occurs easily and thus tire fatigue resistance deteriorates if the warp yarn 2 in the cord fabric 1, namely the reinforcing cord of the belt cover layer 17, is made up of only the aramid fiber. Alternatively, since the heat resistance is insufficient if the warp yarn 2 in the cord fabric 1 that functions as the reinforcing cord of the belt cover layer 17 is made up only of the aliphatic polyamide fiber, the occurrence of flat spots may not be suppressed.

At least one strand of aramid first twist yarn may be used in each warp yarn 2 in the cord fabric 1 that functions as the reinforcing cord of the belt cover layer 17, or preferably one to two strands for a total of three first twist yarn strands are used to configure the composite cord. When three or more aramid first twist yarn strands are used so that the first twist yarn that configures the composite cord has a total of four or more strands, the warp yarn 2 in the cord fabric 1 that functions as the reinforcing cord of the belt cover layer 17 becomes too thick thus adversely affecting tire uniformity.

When a spun yarn of para-aramid fiber is used as the weft yarn 3 in the cord fabric 1 used in the belt cover layer 17, the weft yarn 3 may break easily during fabrication since the elongation at break is small, and thus maintaining the shape of the cord fabric 1 in which the warp yarn 2 is disposed in substantially equal intervals becomes difficult. As a result, the reinforcing cord of the belt cover layer 17 becomes disordered and tire uniformity is reduced. Consequently, the spun yarn of meta-aramid fiber is used as the weft yarn 3 in the cord fabric 1 used in the belt cover layer 17.

The elongation at break of the weft yarn 3 in the cord fabric 1 used in the belt cover layer 17 is preferably no less than 10%, and more preferably no less than 10% and no more than 25%. The yarn fiber fineness of the weft yarn 3 is preferably 150 to 350 dtex. Due to the elongation at break and the yarn fiber fineness of the weft yarn 3 in the cord fabric 1, the shape in which the warp yarn 2 can be disposed in substantially equal intervals in the cord fabric that functions as the reinforcing cords in the belt cover layer 17 can be maintained correctly thus enabling an improvement in tire uniformity.

Since the weft yarn 3 would easily fall out in the cord fabric 1 if the elongation at break of the weft yarn 3 were less than 10%, the shape of the cord fabric 1 with the warp yarn 2 disposed in substantially equal intervals could not be maintained correctly. As a result, the reinforcing cord of the belt cover layer 17 becomes disordered and tire uniformity cannot be sufficiently improved. If the elongation at break of the weft yarn 3 is greater than 25%, the processability is adversely affected when forming the strip material with the cord fabric coated in rubber. If the yarn fiber fineness of the weft yarn 3 is less than 150 dtex, the weft yarn 3 in the cord fabric may break easily and it would be difficult to dispose the warp yarn 2 in substantially equal intervals. As a result, the reinforcing cord of the belt cover layer 17 becomes disordered and tire uniformity cannot be sufficiently improved. If the yarn fiber fineness of the weft yarn 3 is greater than 350 dtex, the weft yarn 3 would be too thick and the warp yarn 2 would be disposed in a zigzag manner in the cross-section of the cord fabric 1 so that the flatness of the warp yarn 2 that functions as reinforcing cords of the belt cover layer 17 would be lost and tire uniformity could not be sufficiently improved.

The total fiber fineness $D1$ of the warp yarn 2 in the cord fabric 1 used in the belt cover layer 17 is 3000 to 5000 dtex and the ratio $D1/D2$ between the total fiber fineness $D1$ of the warp yarn 2 and the fiber fineness $D2$ of the weft yarn 3 is preferably 17 to 25. By prescribing the fiber finenesses of the warp yarn 2 and the weft yarn 3 in the cord fabric 1 in this way, the shape of the cord fabric 1 in which the warp yarn 2 that functions as the reinforcing cords of the belt cover layer 17 is disposed in substantially equal intervals is maintained correctly and tire uniformity can be improved.

When the total fiber fineness $D1$ of the warp yarn 2 in the cord fabric 1 is less than 3000 dtex, the rising of the belt layer in the tire radial direction due to the centrifugal force while the tire is rotating cannot be prevented sufficiently and high-speed durability cannot be sufficiently improved. When the total fiber fineness $D1$ of the warp yarn 2 is greater than 5000 dtex, the weight balance of the overlapping portions at the longitudinal end parts of the strip material 20 that configures the belt cover layer 17 becomes worse since the cord diameter increases and the belt cover layer 17 becomes thicker, and uniformity is adversely affected. If the ratio $D1/D2$ in the cord fabric 1 is less than 17, the weft yarn 3 would be too thick compared to the warp yarn 2 and the warp yarn 2 would be disposed in a zigzag manner in the cross-section of the cord fabric 1 so that the flatness of the warp yarn 2 that functions as the reinforcing cords in the belt cover layer 17 would be lost and tire uniformity could not be sufficiently improved. If the ratio $D1/D2$ in the cord fabric 1 is greater than 25, the weft yarn 3 would be too thin with respect to the warp yarn 2 and the weft yarn 3 could break easily in the cord fabric so that it would be difficult to dispose the warp yarn 2 in substantially equal intervals. As a result, the reinforcing cord of the belt cover layer 17 becomes disordered and tire uniformity cannot be sufficiently improved.

WORKING EXAMPLES 13 types of tire cord fabric were fabricated as tire cord fabric to be used in the belt cover layer of a pneumatic tire. Conventional examples 1 to 4 and working examples 1 to 9 as indicated in Tables 1 and 2 were varied in the thickness and material of the first twist yarns 1 and 2 that configure the warp yarn, the twist direction of the twist yarns in the warp yarn, the total fiber fineness D1 of the warp yarn, and the material, the cord construction, the elongation at break, and the yarn fiber fineness D2 of the weft yarn, and the ratio D1/D2 between the total fiber fineness D1 of the warp yarn and the yarn fiber fineness D2 of the weft yarn. The first twist yarn 1 is the aramid first twist yarn and the first twist yarn 2 is the aliphatic polyamide first twist yarn. The number after the "x" symbol in the first twist yarn thickness column indicates the number of strands of the first twist yarn. "Z" indicates the first twist direction and "S" indicates the second twist direction opposite the direction of the first twist in the twist direction column.

The 13 types of tire cord fabric were evaluated for processability in forming the strip material from the cord fabric coated in rubber according to the evaluation method described below, and the results are indicated in Tables 1 and 2.

Processability

The state of the tire cord fabric after weaving was observed. The occurrence of openings and broken weft yarn leading to noticeably disordered cord fabric is indicated as "C", cord fabric with the warp yarn disposed in a zigzag manner is indicated as "B", and cord fabric in which no disorder of the warp yarn and weft yarn was found is indicated as "A." An evaluation of "B" for processability indicates a permissible range, and an evaluation of "A" indicates excellent processability.

TABLE 1

| | | Conventional ex. 1 | Conventional ex. 2 | Conventional ex. 3 | Conventional ex. 4 |
|---|---|---|---|---|---|
| Warp yarn | First twist yarn 1 material | Aramid | Aramid | Aramid | Aramid |
| | First twist yarn 1 thickness | 1670 dtex × 2 | 1670 dtex × 2 | 1670 dtex × 2 | 1670 dtex × 2 |
| | First twist yarn 1 twist direction | Z | Z | Z | Z |
| | First twist yarn 2 material | Nylon 66 | Nylon 66 | Nylon 66 | Nylon 66 |
| | First twist yarn 2 thickness | 1400 dtex × 1 | 1400 dtex × 1 | 1400 dtex × 1 | 1400 dtex × 1 |
| | First twist yarn 2 direction | Z | Z | S | Z |
| | Total fiber fineness D1 (dtex) | 4740 | 4740 | 4740 | 4740 |
| | Second twist yarn twist direction | S | S | S | Z |
| Weft yarn | Material | PET | Cotton | Meta-aramid | Meta-aramid |
| | Cord construction | Cotton covered yarn | Spun yarn | Spun yarn | Spun yarn |
| | Rupture elongation (%) | 120 | 130 | 14 | 14 |
| | Yarn fiber fineness D2 (dtex) | 300 | 300 | 300 | 300 |
| D1/D2 | | 15.8 | 15.8 | 15.8 | 15.8 |
| Processability | | C | C | C | C |

| | | Working ex. 1 | Working ex. 2 | Working ex. 3 | Working ex. 4 |
|---|---|---|---|---|---|
| Warp yarn | First twist yarn 1 material | Aramid | Aramid | Aramid | Aramid |
| | First twist yarn 1 thickness | 1670 dtex × 2 | 1670 dtex × 2 | 1670 dtex × 2 | 1670 dtex × 2 |
| | First twist yarn 1 twist direction | Z | Z | Z | Z |
| | First twist yarn 2 material | Nylon 66 | Nylon 66 | Nylon 66 | Nylon 66 |
| | First twist yarn 2 thickness | 1400 dtex × 1 | 1400 dtex × 1 | 1400 dtex × 1 | 1880 dtex × 1 |
| | First twist yarn 2 direction | Z | Z | Z | Z |
| | Total fiber fineness D1 (dtex) | 4740 | 4740 | 3070 | 5220 |
| | Second twist yarn twist direction | S | S | S | S |
| Weft yarn | Material | Meta-aramid | Meta-aramid | Meta-aramid | Meta-aramid |
| | Cord construction | Spun yarn | Spun yarn | Spun yarn | Spun yarn |
| | Rupture elongation (%) | 14 | 13 | 13 | 14 |
| | Yarn fiber fineness D2 (dtex) | 300 | 200 | 200 | 300 |
| D1/D2 | | 15.8 | 23.7 | 15.4 | 17.4 |
| Processability | | B | A | B | A |

TABLE 2

| | | Working ex. 5 | Working ex. 6 | Working ex. 7 | Working ex. 8 | Working ex. 9 |
|---|---|---|---|---|---|---|
| Warp yarn | First twist yarn 1 material | Aramid | Aramid | Aramid | Aramid | Aramid |
| | First twist yarn 1 thickness | 1670 dtex × 1 | 1670 dtex × 2 | 1670 dtex × 2 | 1670 dtex × 2 | 1100 dtex × 3 |
| | First twist yarn 1 direction | Z | Z | Z | Z | Z |
| | First twist yarn 2 material | Nylon 66 | Nylon 66 | Nylon 66 | Nylon 66 | Nylon 66 |
| | First twist yarn 2 thickness | 1100 dtex × 1 | 1400 dtex × 1 | 1400 dtex × 1 | 1400 dtex × 1 | 1400 dtex × 1 |
| | First twist yarn 2 direction | Z | Z | Z | Z | Z |
| | Total fiber fineness D1 (dtex) | 2770 | 4740 | 4740 | 4740 | 4700 |
| | Second twist yarn twist direction | S | S | S | S | S |
| Weft yarn | Material | Meta-aramid | Meta-aramid | Meta-aramid | Meta-aramid | Meta-aramid |
| | Cord construction | Spun yarn | Spun yarn | Spun yarn | Spun yarn | Spun yarn |

TABLE 2-continued

|  | Working ex. 5 | Working ex. 6 | Working ex. 7 | Working ex. 8 | Working ex. 9 |
|---|---|---|---|---|---|
| Rupture elongation (%) | 11 | 20 | 11 | 16 | 14 |
| Yarn fiber fineness D2 (dtex) | 150 | 100 | 150 | 600 | 300 |
| D1/D2 | 18.5 | 47.4 | 31.6 | 7.9 | 15.7 |
| processability | A | B | B | B | B |

As can be seen in Tables 1 and 2, the processability of working examples 1 to 9 were superior to that of the conventional examples 1 to 4.

Conversely, the processability of the conventional examples 1 and 2 in which a cotton-covered yarn of polyethylene terephthalate and a spun yarn of cotton were used in the weft yarn was poor. In particular, the fabric was cracked in the tire cord fabric after fabrication in conventional examples 1 and 2. Further, flatness in the cord fabric was lost and processability was poor in the conventional examples 3 and 4.

17 types of tires were fabricated with a common tire size of 255/40R18. The thickness and material of the first twist yarns 1 and 2 that configure the warp yarn, the twist direction of the twist yarns in the warp yarn, the total fiber fineness D1 of the warp yarn, and the material, the cord construction, the elongation at break, and the yarn fiber fineness D2 of the weft yarn, and the ratio D1/D2 between the total fiber fineness D1 of the warp yarn and the yarn fiber fineness D2 of the weft yarn were set in the specification of the tire cord fabric used in the belt cover layer as indicted in Tables 3 to 5, and the tire cord fabric was cut to form the strip material in the widths indicated in Tables 3 to 5 for the conventional examples 5 to 9 and working examples 10 to 21 as indicated in Tables 3 to 5. The first twist yarn 1 is the aramid first twist yarn and the first twist yarn 2 is the aliphatic polyamide first twist yarn. Two-layer belt layer, a belt cover layer that covers the full width of the belt layer on the outer circumference of the belt layer, and the belt cover layer that covers the shoulder regions on the outer circumference of the belt layer were provided in the tires that use the tire cord fabric. The width of the belt layer was 240 mm.

Tire uniformity was evaluated with the following evaluation method on the 17 types of test tires and the results are indicated in the Tables 3 to 5.

Tire Uniformity

Radial force variation of the tires was tested with the tires mounted on rims having a rim size of 18×81/2JJ. The tires were filled to a test pressure of 230 kPa, had a 3 kN load applied thereto, and were rotated at a speed of 60 rpm. Ten tires were tested for each test tire and the measurement values thereof were totaled. The evaluations results used reciprocals of the totaled values of the measurement values and are expressed as an index with Conventional example 5 as 100. A larger index value signifies better uniformity.

TABLE 3

|  |  | Conventional ex. 5 | Conventional ex. 6 | Conventional ex. 7 | Conventional ex. 8 | Conventional ex. 9 |
|---|---|---|---|---|---|---|
| Warp yarn | First twist yarn 1 material | Aramid | Aramid | Aramid | Aramid | Aramid |
|  | First twist yarn 1 thickness | 1670 dtex × 2 | 1670 dtex × 2 | 1670 dtex × 2 | 1670 dtex × 2 | 1670 dtex × 2 |
|  | First twist yarn 1 twist direction | Z | Z | Z | Z | Z |
|  | First twist yarn 2 material | Nylon 66 | Nylon 66 | Nylon 66 | Nylon 66 | Nylon 66 |
|  | First twist yarn 2 thickness | 1400 dtex × 1 | 1400 dtex × 1 | 1400 dtex × 1 | 1400 dtex × 1 | 1400 dtex × 1 |
|  | First twist yarn 2 direction | Z | Z | S | Z | Z |
|  | Total fiber fineness D1 (dtex) | 4740 | 4740 | 4740 | 4740 | 4740 |
|  | Second twist yarn twist direction | S | S | S | Z | S |
| Weft yarn | Material | PET | Cotton | Meta-aramid | Meta-aramid | Meta-aramid |
|  | Cord construction | Cotton covered yarn | Spun yarn | Spun yarn | Spun yarn | Spun yarn |
|  | Rupture elongation (%) | 120 | 130 | 14 | 14 | 14 |
|  | Yarn fiber fineness D2 (dtex) | 300 | 300 | 300 | 300 | 300 |
|  | D1/D2 | 15.8 | 15.8 | 15.8 | 15.8 | 15.8 |
| Strip member width (mm) |  | 5 | 5 | 10 | 10 | 10 |
| Strip member slant (deg.) |  | 5 | 5 | 5 | 5 | 10 |
| Tire uniformity index |  | 100 | 90 | 92 | 85 | 90 |

TABLE 4

|  |  | Working ex. 10 | Working ex. 11 | Working ex. 12 | Working ex. 13 |
|---|---|---|---|---|---|
| Warp yarn | First twist yarn 1 material | Aramid | Aramid | Aramid | Aramid |
|  | First twist yarn 1 thickness | 1670 dtex × 2 | 1670 dtex × 2 | 1670 dtex × 1 | 1670 dtex × 2 |
|  | First twist yarn 1 twist direction | Z | Z | Z | Z |
|  | First twist yarn 2 material | Nylon 66 | Nylon 66 | Nylon 66 | Nylon 66 |
|  | First twist yarn 2 thickness | 1400 dtex × 1 | 1400 dtex × 1 | 1400 dtex × 1 | 1400 dtex × 1 |
|  | First twist yarn 2 direction | Z | Z | Z | Z |
|  | Total fiber fineness D1 (dtex) | 4740 | 4740 | 3070 | 5220 |
|  | Second twist yarn twist direction | S | S | S | S |
| Weft yarn | Material | Meta-aramid | Meta-aramid | Meta-aramid | Meta-aramid |
|  | Cord construction | Spun yarn | Spun yarn | Spun yarn | Spun yarn |
|  | Rupture elongation (%) | 14 | 13 | 13 | 14 |
|  | Yarn fiber fineness D2 (dtex) | 300 | 200 | 200 | 300 |

TABLE 4-continued

|  | Working ex. 10 | Working ex. 11 | Working ex. 12 | Working ex. 13 |
|---|---|---|---|---|
| D1/D2 | 15.8 | 23.7 | 15.4 | 17.4 |
| Strip member width (mm) | 10 | 5 | 5 | 5 |
| Strip member slant (deg.) | 5 | 5 | 5 | 5 |
| Tire uniformity index | 104 | 120 | 105 | 110 |

TABLE 5

| | | Working ex. 14 | Working ex. 15 | Working ex. 16 | Working ex. 17 |
|---|---|---|---|---|---|
| Warp yarn | First twist yarn 1 material | Aramid | Aramid | Aramid | Aramid |
| | First twist yarn 1 thickness | 1670 dtex × 1 | 1670 dtex × 2 | 1670 dtex × 2 | 1670 dtex × 2 |
| | First twist yarn 1 twist direction | Z | Z | Z | Z |
| | First twist yarn 2 material | Nylon 66 | Nylon 66 | Nylon 66 | Nylon 66 |
| | First twist yarn 2 thickness | 1100 dtex × 1 | 1400 dtex × 1 | 1400 dtex × 1 | 1400 dtex × 1 |
| | First twist yarn 2 direction | Z | Z | Z | Z |
| | Total fiber fineness D1 (dtex) | 2770 | 4740 | 4740 | 4740 |
| | Second twist yarn twist direction | S | S | S | S |
| Weft yarn | Material | Meta-aramid | Meta-aramid | Meta-aramid | Meta-aramid |
| | Cord construction | Spun yarn | Spun yarn | Spun yarn | Spun yarn |
| | Rupture elongation (%) | 11 | 20 | 11 | 16 |
| | Yarn fiber fineness D2 (dtex) | 150 | 100 | 150 | 600 |
| D1/D2 | | 18.5 | 47.4 | 31.6 | 7.9 |
| Strip member width (mm) | | 5 | 5 | 5 | 5 |
| Strip member slant (deg.) | | 5 | 5 | 5 | 5 |
| Tire uniformity index | | 115 | 101 | 102 | 101 |
| | | Working ex. 18 | Working ex. 19 | Working ex. 20 | Working ex. 21 |
| Warp yarn | First twist yarn 1 material | Aramid | Aramid | Aramid | Aramid |
| | First twist yarn 1 thickness | 1670 dtex × 2 | 1670 dtex × 2 | 1670 dtex × 2 | 1100 dtex × 3 |
| | First twist yarn 1 twist direction | Z | Z | Z | Z |
| | First twist yarn 2 material | Nylon 66 | Nylon 66 | Nylon 66 | Nylon 66 |
| | First twist yarn 2 thickness | 1400 dtex × 1 | 1400 dtex × 1 | 1400 dtex × 1 | 1400 dtex × 1 |
| | First twist yarn 2 direction | Z | Z | Z | Z |
| | Total fiber fineness D1 (dtex) | 4740 | 4740 | 4740 | 4700 |
| | Second twist yarn twist direction | S | S | S | S |
| Weft yarn | Material | Meta-aramid | Meta-aramid | Meta-aramid | Meta-aramid |
| | Cord construction | Spun yarn | Spun yarn | Spun yarn | Spun yarn |
| | Rupture elongation (%) | 13 | 13 | 13 | 14 |
| | Yarn fiber fineness D2 (dtex) | 200 | 200 | 200 | 300 |
| D1/D2 | | 23.7 | 23.7 | 23.7 | 15.7 |
| Strip member width (mm) | | 2 | 10 | 15 | 5 |
| Strip member slant (deg.) | | 5 | 5 | 5 | 5 |
| Tire uniformity index | | 125 | 115 | 110 | 103 |

As can be seen from Tables 3 to 5, the tire uniformity of the working examples 10 to 21 is superior to that of the conventional examples 5 to 9. In particular, the tire uniformity of working examples 11, 13, 14, and 18 to 20 indicates a large improvement.

Conversely, the tire uniformity improvement could not be achieved in the conventional examples 5 and 6 that used a tire cord fabric in which a cotton-covered yarn of polyethylene terephthalate and a spun yarn of cotton were used in the weft yarn. In particular, the tire uniformity of the conventional example 6 that used the cotton spun yarn in the weft yarn was very poor. The ends of the strip material became disordered in the conventional examples 7 and 8 and thus tire uniformity was poor. Further, the tire uniformity was poor in the conventional example 9 in which the slant of the strip material was over 5°.

What is claimed is:

1. A tire cord fabric comprising:
 a plurality of warp yarns disposed in parallel; and
 a weft yarn weaved so as to cross the warp yarns in a coarse density;
 the warp yarn including at least one aramid first twist yarn having a first twist added to an aramid fiber bundle, and one aliphatic polyamide first twist yarn having a first twist in the same direction as the aramid first twist yarn added to an aliphatic polyamide fiber bundle;
 the aramid first twist yarn and the aliphatic polyamide first twist yarn being bundled and second twisted in the direction opposite the first twist;
 the weft yarn being a spun yarn of meta-aramid fiber;
 the weft yarn being weaved so that the tire cord fabric is plain woven;
 a total fiber fineness D1 of the warp yarn being 2770 to 5220 dtex and a fiber fineness D2 of the weft yarn being 150 to 300 dtex; and
 a ratio D1/D2 between the total fiber fineness D1 of the warp yarn and the fiber fineness D2 of the weft yarn being 17 to 25.

2. The tire cord fabric according to claim 1, wherein an elongation at break of the weft yarn is no less than 10%.

3. The tire cord fabric according to claim 1, wherein the total fiber fineness D1 of the warp yarn is 3000 to 5000 dtex.

4. A pneumatic tire comprising:

a carcass layer mounted between a pair of left and right bead portions;

a belt layer disposed to the outside of the carcass layer in the tire radial direction; and a belt cover layer formed by a strip material of a cord fabric covered in rubber spirally wound onto the outer circumference of the belt layer in the tire radial direction, in a manner at a slant of 5° or less with respect to the tire circumferential direction;

the cord fabric including a plurality of warp yarns disposed in parallel, and a weft yarn weaved so as to cross the warp yarns in a coarse density, the warp yarns extending in the longitudinal direction of the strip material;

the warp yarn including at least one aramid first twist yarn having a first twist added to an aramid fiber bundle, and one aliphatic polyamide first twist yarn having a first twist in the same direction as the aramid first twist yarn added to an aliphatic polyamide fiber bundle, and the aramid first twist yarn and the aliphatic polyamide first twist yarn being bundled and second twisted in the direction opposite the first twist;

the weft yarn being a spun yarn of meta-aramid fiber;

the weft yarn being weaved so that the tire cord fabric is plain woven;

a total fiber fineness D1 of the warp yarn being 2770 to 5220 dtex and a fiber fineness D1 of the weft yarn being 150 to 300 dtex; and a ratio D1/D2 between the total fiber fineness D1 of the warp yarn and the fiber fineness D2 of the weft yarn being 17 to 25.

5. The pneumatic tire according to claim 4, wherein an elongation at break in the cord fabric of the weft yarn is no less than 10%.

6. The pneumatic tire according to claim 4, wherein the total fiber fineness D1 of the warp yarn is 3000 to 5000 dtex.

7. The pneumatic tire according to claim 4, wherein the width of the strip material is 1.5% to 7% of the maximum width of the belt layer.

8. The tire cord fabric according to claim 2, wherein the total fiber fineness D1 of the warp yarn is 3000 to 5000 dtex.

9. The pneumatic tire according to claim 5, wherein the total fiber fineness D1 of the warp yarn is 3000 to 5000 dtex.

10. The pneumatic tire according to claim 5, wherein the width of the strip material is 1.5% to 7% of the maximum width of the belt layer.

11. The pneumatic tire according to claim 6, wherein the width of the strip material is 1.5% to 7% of the maximum width of the belt layer.

12. The pneumatic tire according to claim 9, wherein the width of the strip material is 1.5% to 7% of the maximum width of the belt layer.

13. The pneumatic tire according to claim 4, wherein the width of the strip material is 2 to 15 mm.

\* \* \* \* \*